United States Patent
Lee et al.

(10) Patent No.: US 6,761,952 B1
(45) Date of Patent: Jul. 13, 2004

(54) BIS-STYRYL DYE AND METHOD FOR MANUFACTURING THE SAME AND ITS USE FOR A HIGH DENSITY OPTICAL RECORDING MEDIUM

(75) Inventors: Ming-Chia Lee, Taichung Hsien (TW); Wen-Yih Liao, Taichung (TW); Chien-Liang Huang, Taoyuan (TW); Chuen-Fuw Yan, Kaohsiung (TW); Tzuan-Ren Jeng, Hsinchu (TW); Ching-Yu Hsieh, Hsinchu (TW); Shin-Shin Wang, Hsinchu (TW); Hui-Ping Tsai, Changhua (TW); Chii-Chang Lai, Fengyuan (TW); Jie-Hwa Ma, Hsinchu (TW); Jong-Lieh Yang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 39 days.

(21) Appl. No.: 10/457,979

(22) Filed: Jun. 9, 2003

(30) Foreign Application Priority Data

May 14, 2003 (TW) ........................ 92113056 A (51) Int. Cl.[7] ............................... B32B 3/02
(52) U.S. Cl. ................... 428/64.1; 428/64.4; 428/64.8; 430/270.14
(58) Field of Search .............. 428/64.1, 64.4, 428/64.8, 913; 430/270.14, 270.15, 495.1, 945

(56) References Cited

U.S. PATENT DOCUMENTS 6,103,331 A * 8/2000 Kanno ...................... 428/64.1

2003/0202458 A1 * 10/2003 Wang et al. ................. 369/283

* cited by examiner

*Primary Examiner*—Elizabeth Mulvaney
(74) *Attorney, Agent, or Firm*—J.C. Patents

(57) ABSTRACT

This invention provides imin complex dyes for a high-density optical disc recording medium having the following formula (I):

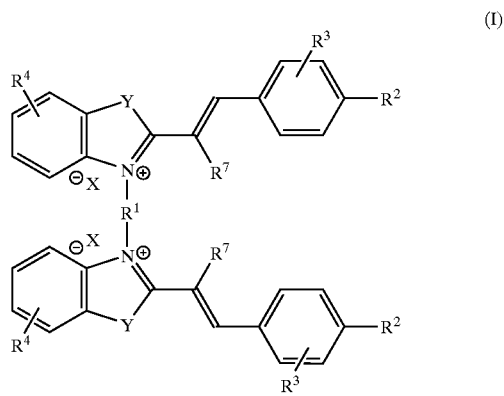

wherein Y constitutes oxygen atom, sulfate atom, carbon atom with substitutes (C—$R^5$) or nitrogen atom with substitutes (N—$R^6$); $R^1$ constitutes alkyl group having carbon number one to eighteen with or without substitutes or ether group, p-alkyl benzyl group with or without substitutes; $R^2$, $R^3$, $R^5$, $R^6$, $R^7$ can be same or different groups; and X constitutes halogen atom, $ClO_4^-$, $BF_4^-$, $PF_6^-$, $SbF_6^-$, $TCNQ^-$, $TCNE^-$, naphthalenesulfonic acid or organometallic complex.x. The bis-styryl dyes whose spectra maximum absorption in visible light range of wavelength of 300 nm~800 nm can be used as a high density optical disc recording medium.

11 Claims, 2 Drawing Sheets

BIS-STYRYL DYE AND METHOD FOR MANUFACTURING THE SAME AND ITS USE FOR A HIGH DENSITY OPTICAL RECORDING MEDIUM

CROSS-REFERENCE TO RELATED APPLICATION

This application claims the priority benefit of Taiwan application serial no. 92113056, filed May 14, 2003.

BACKGROUND OF THE INVENTION

1. Field of the Invention

The present invention generally relates to a dye for a high-density optical disc recording medium. More particularly, the present invention relates to a bis-styryl dye and method for manufacturing the same and its use for a high-density optical disc recording medium.

2. Description of the Related Art

With the rapid advancement of information communication and the development of computer capabilities, a variety of information need to be stored in a more compact storage medium having higher storage density, higher storage capacity and low cost. The storage capacity, density and cost of a conventional magnetic storage medium do not meet the demand of the current development of information technology. The trend of development and research of the storage medium, particularly an optical storage medium is a very interesting topic. For an optical storage medium, the development of a dye for manufacturing the recording layer is the most interesting breakthrough. Presently, a dye having a functional pigment manufactured through organic chemical synthesis and photochemistry having optical characteristics is used in a variety of devices in the industrial field and for further development in the industrial field, such as nonlinear optical element, recording and displaying of information on a disc, photoresistor, thermal/photo/electric sensing and indicator, transformation and storage of energy, medical treatment and biological technology.

In 1981, a 3,3'-diethyl-12-acetyl-thiatetracyanine perchlorate has been originally used in the manufacturing of a disc by Law et al. (K. Y. Law, P. S. Vincett, and G. E. Johnson, Appl. Phys. Lett., 39, 718 (1981)). The major reason for using such an organic pigment is due to its maximum light absorbance property in the near infrared ("NIR") region. The recording disc may be manufactured by mixing the 3,3'-diethyl-12-acetyl-thiatetracyanine perchlorate with PVAc and spin coated onto the disc. With the successful application of the organic pigment on an optical storage medium, a variety of dyes having different structures are used in the development of optical storage medium, such as the Japanese Patent Nos. 072,254,167, 09,193,545, 09,194,545, 09,226,250, 09,274,732, 10,044,066 and 11,310,728 etc. The major reason for using such an organic dye as a storage media is that the organic dye material can be coated on the substrate by using a conventional spin coating method, other than using a vacuum evaporation method, thus the manufacturing process can be simplified and the cost can also be reduced. Therefore, the stability and the solubility of the organic dye in organic solvent are important factors in choosing the organic dye.

SUMMARY OF THE INVENTION

Accordingly, the purpose of the present invention is to provide a bis-styryl dye, and a structure and a manufacturing method of high-density storage medium using thereof.

As embodied and broadly described herein, the present invention provides a bis-styryl dye derivative including a following chemical structure (I):

In the above chemical structure, Y represents oxygen atom, sulfate atom, carbon atom with substitutes or nitrogen atom with or without substitutes.

$R^1$ represents an alkyl group having carbon number one to eighteen with or without substitutes or ether group, p-alkyl benzyl group with or without substitutes.

$R^2$, $R^3$, $R^5$, $R^6$, $R^7$ can be same or different groups including hydrogen atom, halogen atom, boronic acid, nitro group, cyano group, adamantyl group, sulfo group, sulfonyl group, amide group which each contain oxygen, sulfur or nitrogen, sulalkyl group with carbon number one to eight, alkoxyl group with carbon number one to eight, carboxy group with carbon number one to eight, alkoxycarbonyl group with carbon number one to eight, hydroxyl group, ferrocenyl group or heterocyclic group.

$R^4$ can be hydrogen atom, halogen atom, nitro group, alkyl group, sulfonyl group, benzene ring with or without substitutes.

X can be halogen atom, $ClO_4^-$, $BF_4^-$, $PF_6^-$, $SbF_6^-$, $TCNQ^-$, $TCNE^-$, naphthalenesulfonic acid or organometallic complex.

In a preferred embodiment of the present invention, a manufacturing method of the bis-styryl dye is provided. The manufacturing method of the bis-styryl dye having the chemical structure (I) includes the following three steps:

Step (a): a compound having the chemical structure (IV) is synthesized from the compounds having a chemical structure (II) and chemical structure (III) as shown below:

Step (b): the compound having the chemical structure (II) is synthesized from the compounds having a chemical structure (V) and chemical structure (VI) by the following reaction:

In which Y includes oxygen atom, sulfate atom, carbon atom with substitutes (i.e. C—$R^5$) or nitrogen atom with or without substitutes (i.e. C—$R^6$); $R^1$ includes alkyl group having carbon number one to eighteen with or without substitutes or ether group, p-alkyl benzyl group with or without substitutes. Hereinafter, the compounds having the chemical structure (III), (V) and (VI) will be described in the following, but the invention may, however, be embodied in many different forms and should not be construed as limited to the embodiments set forth hereinafter.

As to the compound having the chemical structure (III) is shown below:

First, when $R^3$ is a hydrogen atom, the compound having the chemical an be one of the compounds having the structure (III-1) shown below:

Secondly, when the $R^3$ is an alkyl group, alkoxy group or alkylate group, the compound having the chemical structure (III) can be one of the compounds having the structure (III-2) shown below:

(III-2)

Thirdly, when the $R^3$ is a halogen atom, the compound having the chemical structure (III) can be one of the compounds having the structure (III-3) shown below:

(III-3)

As to the compound having the chemical structure (V) is shown below:

(V)

First, when Y is a carbon atom having substitutes, the compound having the chemical structure (V) can be one of the compounds having the structure (V-1) shown below:

(V-1)

-continued

Secondly, when Y is an oxygen atom or a sulfate atom, the compound having the chemical structure (V) can be one of the compounds having the structure (V-2) shown below:

(V-2)

Thirdly, when Y is a nitrogen atom, the compound having the chemical structure (V) can be one of the compounds having the structure (V-3) shown below:

(V-3)

As to the compound having the chemical structure (VI) is shown below:

$$I—R^1—I \quad (VI)$$

Firstly, when $R^1$ is an alkyl group with or without substitutes, the compound having the chemical structure (VI) can be one of the compounds having the structure (VI-1) shown below:

(VI-1)

Secondly, when $R^1$ is a p-alkyl benzyl group with or without substitutes, the compound having the chemical structure (VI) can be one of the compounds having the structure (VI-2) shown below:

(VI-2)

Step (c): the compound having the chemical structure (I) is synthesized from the ion exchange reaction of the compound having a chemical structure (IV) and NaX, KX or organometallic complex, in organic solvent as shown below:

(IV)

-continued

(V)

In the chemical structures described above, X includes a halogen atom, ClO4−, BF4−, PF6−, SbF6−, TCNQ−, TCNE−, naphthalenesulfonic acid or organometallic complex.

As shown below, if X is an organometallic complex, X can be one of the compounds having the structure (X-1) shown below:

M = Ni, Zn wherein M = Co

Accordingly, the bis-styryl dyes of the present invention is suitable material for making an optical storage medium since the bis-styryl dyes of the present invention have high absorptions, high sensitivity and high writing speed in a wavelength range of about 300 nm to about 800 nm. Moreover, the bis-styryl dyes of the present invention can be dissolved in organic solvents, thus the bis-styryl dyes can be coated on a substrate by using a simple coating method including, but not limited to, inkjet printing, roll-pressing coating, dip coating or spin coating method.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention provides a high density storage media using a bis-styryl dye having the chemical structure (I) shown above. The following Example will describe the synthesis of the intermediate compound having the chemical structure (II) shown above.

EXAMPLE 1

The starting materials of a compound having a structure (V) with $R^1$ being $C_4H_8$ 0.01 mole and a compound having a structure (VI) with $R^4$ being H and Y being —$C(CH_8)_2$ 0.02 mole are dissolved in 20 ml of ethyl acetate, and heated to the reflux temperature for about 3~4 hours. After the reaction is completed, the solution is filtered and baked, and an off-white solid crystal having a yield of about 70% is obtained. The chemical structure (II-1) of the off-white solid is shown below:

(II-1)

Hereinafter, a second Example will describe the synthesis of the bis-styryl compound having the chemical structure (I) above.

EXAMPLE 2

Figure 1:
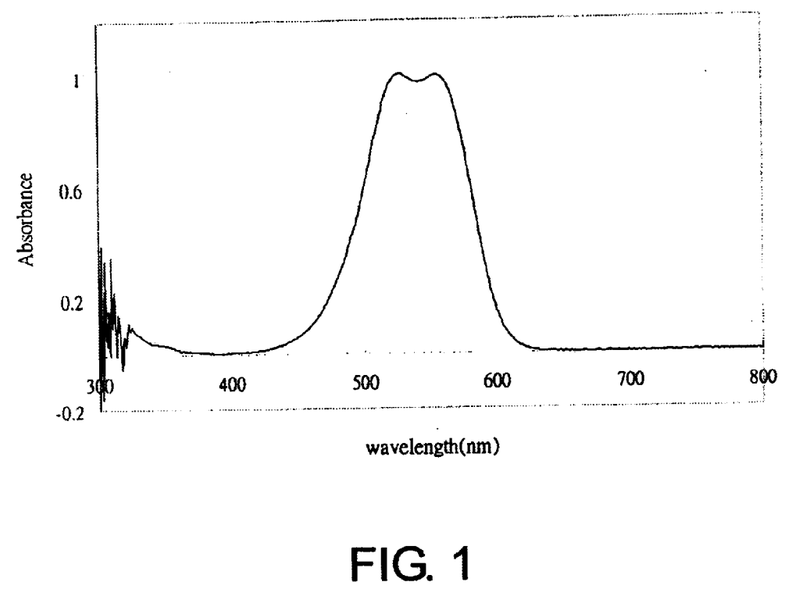
FIG. 1 is a diagram illustrating an absorption spectrum of the solution of the compound (I-1) of a preferred embodiment of the present invention.

The starting materials of the compound having the structure (III) with $R^2$ being 3,5-dimethylpiperidine and $R^3$ being hydrogen atom 0.02 mole and a compound having the structure (II-1) 0.01 mole are dissolved in 20 ml of alcohol, and heated to the reflux temperature of alcohol for about 3~4 hours. After the reaction is completed, the (I-1)

solution is filtered and baked, and a gray solid crystal having a chemical structure (IV-1) is obtained. Then the solid having a structure (IV-1) 0.01 mole and $NaPF_6$ 0.01 mole are dissolved in 25 ml of alcohol, and heated to the reflux temperature to process an ion exchange reaction. After the reaction is completed, the solution is filtered and baked, and a purple solid crystal having a chemical structure (I-1) and yield of about 80% is obtained. The chemical structure (I-1) of the purple solid crystal is shown below:

Referring to FIG. 1, an absorption spectrum of a solution of the compound having the structure (I-1) is obtained, the maximum absorption is observed at a wavelength about 657 nm, and the refraction index is about 2.28+0.44i thereon.

Hereinafter, a third Example will describe a bis-styryl compound having the chemical structure (I) above provided for a blue laser storage medium.

EXAMPLE 3

The chemical reaction of the Example is similar to that described in the second Example but with different starting materials described above. Finally a bis-styryl compound is obtained and the chemical structure (I-2) thereof is shown below:

(I-2)

Figure 2:
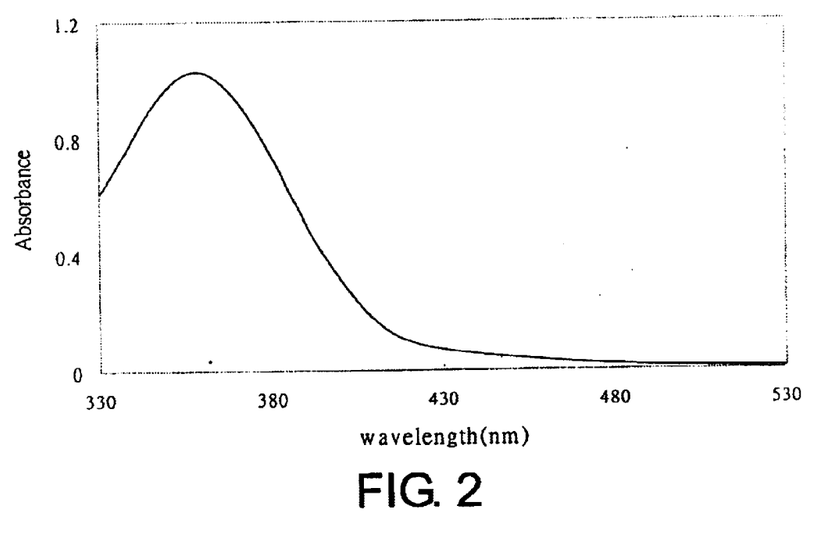
FIG. 2 is a diagram illustrating an absorption spectrum of the solution of the compound (I-2) of a preferred embodiment of the present invention.

Referring to FIG. 2, an absorption spectrum of the compound having the structure (I-2) dissolved in alcohol is obtained, the maximum absorption is observed at a wavelength of about 359 nm.

By replacing the substituent in the starting materials having the structure (III), (V) and (VI) described above, and repeating the steps of the chemical reactions described in the first and second Examples, a variety of bis-styryl compound having different maximum absorptions can be obtained.

Hereinafter, a fourth Example will describe a manufacturing method of a high density optical disc recording medium using the bis-styryl compound having the chemical structure (I).

EXAMPLE 4

The bis-styryl compound having the chemical structure (I-1) 1.5 g obtained above is dissolved in 2,2,3,3-tetrafluoropropanol to obtain a 100 g dye solution.

Figure 3:
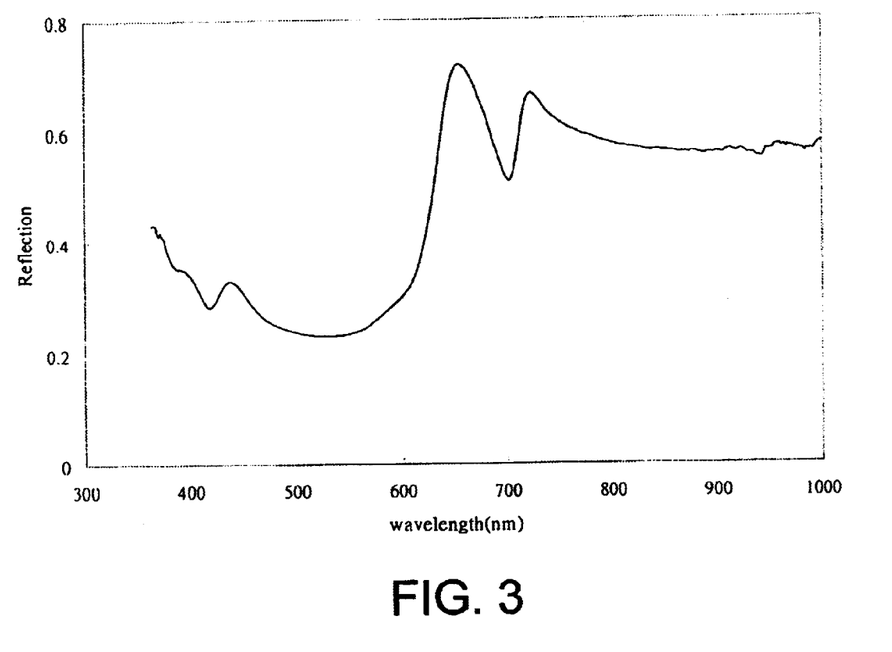
FIG. 3 is a diagram illustrating a reflection spectrum of a disc having a recording layer formed by the compound (I-1) of a preferred embodiment of the present invention.

A transparent polycarbonate ("PC") substrate of a thickness of 0.6 mm having lands or grooves, pits and no recording data, is provided. The dye solution obtained above is spin coated on the substrate following the steps of a coating process, a spreading process and a baking process, and then a bis-styryl dye layer having a thickness in a range of about 70 nm to about 200 nm is formed on the substrate. Thereafter a reflection layer having a thickness in a range of about 50 nm to about 300 nm is plated on the bis-styryl dye layer, in which the material of the reflection layer includes, but not limited to, gold or silver. Finally another transparent PC substrate of a thickness of 0.6 mm having no recording data is adhered onto the substrate obtained above. Thus, a high-density recordable disc, e.g., a recordable digital versatile digital ("DVD-R") is obtained. The method of adhering both of the substrates includes, but not limited to, spin coating, screen printing or hot melt glue coating method. FIG. 3 is a diagram illustrating a reflection spectrum of a disc having a recording layer formed by the compound (I-1) of a preferred embodiment of the present invention. Referring to FIG. 3, the reflection of the disc obtained above is larger than 45% in the wavelength larger than 635 nm or 650 nm.

The writing and reading operation of the disc obtained above are tested. In a preferred embodiment of the present invention, when a writing operation is implemented at 658 nm with a power 10 mW and a reading operation is also implemented at the same wavelength with a power in a range of about 0.5 mW to about 1.5 mW, the carrier noise ratio ("CNR") value is about 60 dB.

Accordingly, since the bis-styryl dyes of the present invention having high absorptions, high sensitivity and high writing speed in a wavelength range of about 300 nm to about 800 nm, a storage medium having a recording layer manufactured from the bis-styryl dye has high recording sensitivity and high signal to noise ("S/N") ratio. Therefore, the bis-styryl dyes of the invention are excellent materials for making optical storage medium. Moreover, the bis-styryl dyes of the present invention can be dissolved in organic solvents such as, but not limited to, alcohol, ketone, ester, ether, halogen or imide. Thus the bis-styryl dyes can be coated on a substrate by using a simple coating method such as, but not limited to, inkjet printing, roll-pressing coating, dip coating or spin coating method. The bis-styryl dye of the invention can also be used as photoresistor of an integrated circuit, as a dye for dyeing textile fibers in textile industry, dyestuff for copying and printing.

Although the preferred embodiment is described using a recording layer comprising the bis-styryl dyes as shown and described above, however it should be understood by those skilled in the art that in addition to bis-styryl dyes, other dye materials may also included to practice the present invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A dye, comprising:

a bis-styryl dye derivative, having a following chemical structure:

wherein Y constitutes oxygen atom, sulfate atom, carbon atom with substitutes (C—$R^5$) or nitrogen atom with substitutes (N—$R^6$);

$R^1$ constitutes alkyl group having carbon number one to eighteen with substitutes or ether group, p-alkyl benzyl group with or without substitutes;

$R^2$, $R^3$, $R^5$, $R^6$ can be same or different groups including hydrogen atom, halogen atom, boronic acid, nitro group, cyano group, adamantyl group, sulfo group, sulfonyl group, amide group which each contain oxygen, sulfur or nitrogen, sulalkyl group with carbon number one to eight, alkoxyl group with carbon number one to eight, carboxy group with carbon number one to eight, alkoxycarbonyl group with carbon number one to eight, hydroxyl group, ferrocenyl group or heterocyclic group;

$R^4$ can be hydrogen atom, halogen atom, nitro group, alkyl group, sulfonyl group, benzene ring with or without substitutes; and X constitutes halogen atom, $ClO4^-$, $BF4^-$, $PF6^-$, $SbF6^-$, $TCNQ^-$, $TCNE^-$, naphthalenesulfonic acid or organo-metallic complex.

2. An optical recording medium comprising:
a transparent substrate;
a recording layer comprising at least
a bis-styryl dye derivative, having a following chemical structure:

wherein Y constitutes oxygen atom, sulfate atom, carbon atom with substitutes (C—$R^5$) or nitrogen atom with substitutes (N—$R^6$);

$R^1$ constitutes alkyl group having carbon number one to eighteen with or without substitutes or ether group, p-alkyl benzyl group with or without substitutes;

$R^2$, $R^3$, $R^5$, $R^6$, R7 can be same or different groups including hydrogen atom, halogen atom, boronic acid, nitro group, cyano group, adamantyl group, sulfo group, sulfonyl group, amide group which each contain oxygen, sulfur or nitrogen, sulalkyl group with carbon number one to eight, alkoxyl group with carbon number one to eight, carboxy group with carbon number one to eight, alkoxycarbonyl group with carbon number one to eight, hydroxyl group, ferrocenyl group or heterocyclic group;

$R^4$ can be hydrogen atom, halogen atom, nitro group, alkyl group, sulfonyl group, benzene ring with or without substitutes; and X constitutes halogen atom, $ClO4^-$, $BF4^-$, $PF6^-$, $SbF6^-$, $TCNQ^-$, $TCNE^-$, naphthalenesulfonic acid or organo-metallic complex a reflective layer disposed over said recording layer; and a second substrates disposed over said reflective layer.

3. The optical medium of claim 2, wherein a thickness of the recording layer is in a range of about 70 nm to about 200 nm.

4. The optical medium of claim 2, wherein a thickness of the reflection layer is in a range of about 50 nm to about 300 nm.

5. The optical medium of claim 2, wherein the recording layer can be formed using inkjet printing, roll-pressing coating, dip coating or spin coating methods.

6. The optical medium of claim 2, wherein the second substrate is adhered onto the reflective layer using spin coating, screen-printing or hot melt glue coating method.

7. A method of manufacturing a storage media, comprising:

providing a dye, comprising:
a bis-styryl dye derivative, having a following chemical structure:

wherein Y constitutes oxygen atom, sulfate atom, carbon atom with substitutes (C—$^5$) or nitrogen atom with substitutes (N—R$^6$);

R$^1$ constitutes alkyl group having carbon number one to eighteen with or without substitutes or ether group, p-alkyl benzyl group with or without substitutes;

R$^2$, R$^3$, R$^5$, R$^6$, R$^7$ can be same or different groups including hydrogen atom, halogen atom, boronic acid, nitro group, cyano group, adamantyl group, sulfo group, sulfonyl group, amide group which each contain oxygen, sulfur or nitrogen, sulalkyl group with carbon number one to eight, alkoxyl group with carbon number one to eight, carboxy group with carbon number one to eight, alkoxycarbonyl group with carbon number one to eight, hydroxyl group, ferrocenyl group or heterocyclic group;

R$^4$ can be hydrogen atom, halogen atom, nitro group, alkyl group, sulfonyl group, benzene ring with or without substitutes; and X constitutes halogen atom, ClO4$^-$, BF4$^-$, PF6$^-$, SbF6$^-$, TCNQ$^-$, TCNE$^-$, naphthalenesulfonic acid or organometallic complex;

providing a first transparent substrate having a signal surface;

preparing a dye solution by dissolving said dye into an organic solvent;

forming a recording layer on the first transparent substrate;

forming a reflection layer on the recording layer; and adhering a second substrate onto the first transparent substrate.

8. The method of claim 7, wherein a thickness of the recording layer is in a range of about 70 nm to about 200 nm.

9. The method of claim 7, wherein a thickness of the reflection layer is in a range of about 50 nm to about 300 nm.

10. The method of claim 7, wherein the step of forming a recording layer on the first transparent substrate comprises inkjet printing, roll-pressing coating, dip coating or spin coating method.

11. The method of claim 7, wherein the step of adhering said second substrate onto said first substrate includes spin coating, screen-printing or hot melt glue coating method.

* * * * *